(12) United States Patent
Alla (10) Patent No.: US 8,369,826 B2
(45) Date of Patent: Feb. 5, 2013

(54) METHODS AND APPARATUS TO IDENTIFY WIRELESS SUBSCRIBER ACTIVITY STATUS

(75) Inventor: Madhusudhad Reddy Alla, Richardson, TX (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 629 days.

(21) Appl. No.: 12/406,538

(22) Filed: Mar. 18, 2009

(65) Prior Publication Data

US 2010/0240341 A1 Sep. 23, 2010

(51) Int. Cl.
*H04M 11/00* (2006.01)
*H04W 4/00* (2009.01)
*H04H 60/61* (2008.01)

(52) U.S. Cl. ............... 455/405; 455/435.1; 455/466; 455/2.01

(58) Field of Classification Search .......... 455/405, 455/435.1, 466, 2.01
See application file for complete search history.

(56) References Cited

U.S. PATENT DOCUMENTS

| | | | |
|---|---|---|---|
| 5,661,792 A | 8/1997 | Akinpelu et al. |
| 5,822,410 A | 10/1998 | McCausland et al. |
| 5,903,625 A | 5/1999 | May |
| 6,006,085 A | 12/1999 | Balachandran |
| 6,028,914 A | 2/2000 | Lin et al. |
| 6,049,599 A | 4/2000 | McCausland et al. |
| 6,169,793 B1 | 1/2001 | Godwin et al. |
| 6,169,896 B1 | 1/2001 | Sant et al. |
| 6,192,115 B1 | 2/2001 | Toy et al. |
| 6,298,352 B1 | 10/2001 | Kannan et al. |
| 6,301,471 B1 | 10/2001 | Dahm et al. |
| 6,411,807 B1 | 6/2002 | Amin et al. |
| 6,487,390 B1 | 11/2002 | Virine et al. |
| 6,556,992 B1 | 4/2003 | Barney et al. |
| 6,597,903 B1 | 7/2003 | Dahm et al. |
| 6,618,587 B1 * | 9/2003 | Ghafoor ............... 455/419 |
| 6,625,269 B1 | 9/2003 | Kim |
| 6,636,868 B1 | 10/2003 | Bauer et al. |
| 6,751,295 B2 | 6/2004 | McCulley et al. |
| 6,754,470 B2 | 6/2004 | Hendrickson et al. |
| 6,788,926 B1 | 9/2004 | Frangione et al. |

(Continued)

FOREIGN PATENT DOCUMENTS

| | | |
|---|---|---|
| EP | 1309207 | 5/2003 |
| WO | 9818270 | 4/1998 |

(Continued)

OTHER PUBLICATIONS

Office Action for U.S. Appl. No. 11/486,498, issued on Apr. 3, 2009, 8 pages.

(Continued)

*Primary Examiner* — Christopher M Brandt
(74) *Attorney, Agent, or Firm* — Hanley, Flight & Zimmerman, LLC (57) ABSTRACT

Example methods and apparatus to identify wireless subscriber activity status are disclosed. A disclosed example method includes identifying a market of interest associated with wireless services, and creating a list of telephone numbers (TNs) from the identified market of interest. The example method also includes initializing each TN in the list of TNs as dormant, monitoring each TN in the list of TNs during a monitoring duration for an indication of activity, and when the indication of activity is received, associating one of the TNs in the list of TNs with an active status.

21 Claims, 8 Drawing Sheets

U.S. PATENT DOCUMENTS

| | | | |
|---|---|---|---|
| 6,832,211 | B1 | 12/2004 | Thomas et al. |
| 7,003,306 | B2 | 2/2006 | Henry-Labordere |
| 7,058,412 | B2 | 6/2006 | Lowe et al. |
| 7,139,246 | B2 | 11/2006 | Harris et al. |
| 7,190,969 | B1* | 3/2007 | Oh et al. ........................ 455/551 |
| 7,248,862 | B2 | 7/2007 | Minborg et al. |
| 7,366,515 | B2 | 4/2008 | Zhao et al. |
| 7,369,865 | B2 | 5/2008 | Gabriel et al. |
| 7,599,681 | B2 | 10/2009 | Link, II et al. |
| 8,031,856 | B2 | 10/2011 | Mikleton et al. |
| 2002/0016731 | A1 | 2/2002 | Kupersmit |
| 2002/0023003 | A1 | 2/2002 | Raheman |
| 2002/0069037 | A1 | 6/2002 | Hendrickson et al. |
| 2002/0086671 | A1 | 7/2002 | Amin et al. |
| 2002/0111809 | A1 | 8/2002 | McIntosh |
| 2003/0023571 | A1 | 1/2003 | Barnhill |
| 2003/0061152 | A1 | 3/2003 | De et al. |
| 2003/0064722 | A1 | 4/2003 | Frangione et al. |
| 2003/0088491 | A1 | 5/2003 | Liu et al. |
| 2003/0190015 | A1 | 10/2003 | McCulley et al. |
| 2003/0200135 | A1 | 10/2003 | Wright |
| 2003/0229534 | A1 | 12/2003 | Frangione et al. |
| 2003/0236694 | A1 | 12/2003 | Liu et al. |
| 2004/0097245 | A1 | 5/2004 | Sheth et al. |
| 2005/0043011 | A1 | 2/2005 | Murray et al. |
| 2005/0111640 | A1 | 5/2005 | Moisey et al. |
| 2005/0271029 | A1 | 12/2005 | Iffland |
| 2006/0023854 | A1 | 2/2006 | Moisan et al. |
| 2006/0109846 | A1 | 5/2006 | Lioy et al. |
| 2006/0135161 | A1 | 6/2006 | Jiang et al. |
| 2007/0099635 | A1* | 5/2007 | Mohanty et al. ............... 455/458 |
| 2007/0121603 | A1 | 5/2007 | Clark, III et al. |
| 2007/0156673 | A1 | 7/2007 | Maga et al. |
| 2007/0165613 | A1 | 7/2007 | Soo et al. |
| 2007/0185867 | A1 | 8/2007 | Maga et al. |
| 2008/0176535 | A1 | 7/2008 | Cai |
| 2008/0182553 | A1 | 7/2008 | Salkini et al. |
| 2008/0228557 | A1 | 9/2008 | Sepehri-Nik et al. |
| 2010/0057812 | A1 | 3/2010 | Moisan et al. |
| 2010/0074431 | A1 | 3/2010 | Enzmann et al. |
| 2010/0091975 | A1 | 4/2010 | Sheth et al. |
| 2010/0167689 | A1* | 7/2010 | Sepehri-Nik et al. ......... 455/405 |

FOREIGN PATENT DOCUMENTS

| | | |
|---|---|---|
| WO | 0039981 | 7/2000 |
| WO | 0056098 | 9/2000 |
| WO | 0219625 | 3/2002 |
| WO | 02071674 | 9/2002 |
| WO | 2007081424 | 7/2007 |
| WO | 2008112352 | 9/2008 |

OTHER PUBLICATIONS

Office Action for U.S. Appl. No. 11/527,219, issued on Dec. 15, 2008, 8 pages.
Office Action for U.S. Appl. No. 10/237,478, issued on Feb. 17, 2009, 16 pages.
Office Action for U.S. Appl. No. 10/237,478, issued on Nov. 14, 2008, 3 pages.
Office Action for U.S. Appl. No. 10/237,478, issued on Sep. 12, 2008, 19 pages.
Office Action for U.S. Appl. No. 10/237,478, issued on Jan. 4, 2008, 15 pages.
Office Action for U.S. Appl. No. 10/237,478, issued on Apr. 19, 2007, 6 pages.
Office Action for U.S. Appl. No. 10/263,782, issued on May 21, 2003, 10 pages.
EP Office Action issued for EP application 03719560.9, issued on Oct. 8, 2008, 3 pages.
CN Office Action issued for CN 03812238.3, issued on Jan. 18, 2008, 11 pages.
CA Office Action issued for CA application 2,481,203, issued on Dec. 4, 2007, 3 pages.
JP Office Action issued for JP application P2003-583001, issued on Sep. 30, 2008, 4 pages.
CN Office Action issued for CN application 01816436.6, issued Dec. 9, 2005, 6 pages.
Vougioukas and Manos Rouincliotis, System for Basic Level Network Fault Mgmt based on the GSM Short Message Service (SMS), Proceedings of EUROCON'2001 International Conference on Trends in Communications vol. 1, 2001, 1 page.
Telephia acquires Mspect, Adding SMS Monitoring to Its Wireless Data QoS Solution, Business Wire, Nov. 13, 2001, 2 pages.
Galaxy Phones, Mobile Phones—The Basics, internet article, www.galaxyphones.co.uk/mobile_phones_basics07.asp, Mar. 2, 2006, 4 pages.
Call Delivery, internet article, www.members.tripod.com, retrieved from internet on Feb. 1, 2006, 1 page.
NPA-NXX, North American Numbering Plan, internet article, voip-info.org, retrieved from internet on May 12, 2008, 3 pages.
Wikipedia, Network Switching Subsystem, internet article, retrieved from the internet on Mar. 2, 2006, 6 pages.
International Bureau, International Search Report for PCT/US03/18070, Aug. 29, 2003, 5 pages.
United States Patent and Trademark Office, Notice of Allowance issued for U.S. Appl. No. 11/445,069, mailed Oct. 19, 2010, 8 pages.
United States Patent and Trademark Office, Office Action issued for U.S. Appl. No. 11/486,498, Notification Date Nov. 4, 2009, 20 pages.
European Patent Office, Communication issued in connection with EP 09012467.8, Oct. 27, 2010, 1 page.
European Patent Office, Communication issued in connection with EP 09012468.6, Nov. 8, 2010, 1 page.
United States Patent and Trademark Office, Office Action issued for U.S. Appl. No. 11/527,219, mailed on Jun. 24, 2009, 20 pages.
European Patent Office, Communication with European Search Report for EP Application No. 09012467.8, dated Mar. 23, 2010, 7 pages.
Patent Office of the People'S Republic of China, Notification to Grant Patent Right for Invention for CN Application No. 03812238.3, issued Mar. 24, 2010, 3 pages.
Korean Intellectual Property Office, Non-Final Rejection issued for KR Application No. 10-2004-7015715, dated Nov. 10, 2009, 8 pages.
Korean Intellectual Property Office, Final Rejection issued for KR Application No. 10-2004-7015715, dated Apr. 12, 2010, 6 pages.
United States Patent and Trademark Office, Notice of Allowance issued for U.S. Appl. No. 11/486,498, mailed Apr. 20, 2010, 14 pages.
United States Patent and Trademark Office, Office Action issued for U.S. Appl. No. 11/445,069, dated May 10, 2010, 13 pages.
United States Patent and Trademark Office, "Notice of Abandonment," issued in connection with U.S. Appl. No. 11/527,219, on Jan. 8, 2010 (2 pages).
United States Patent and Trademark Office, "Notice of Allowance," issued in connection with U.S. Appl. No. 11/486,498, on Feb. 19, 2010 (4 pages).
United States Patent and Trademark Office, "Final Office Action," issued in connection with U.S. Appl. No. 10/237,478, on Oct. 2, 2009 (22 pages).
European Patent Office, "Extended European Search Report," issued in connection with European Patent Application Serial No. 09012468.6, on Jan. 26, 2010 (6 pages).
QUALCOMM, "Handling SMS in BREW," Article retrieved from www.qualcomm.com, on Aug. 30, 2007 (3 pages).
Palm, Inc., "SMS Handbook," 2001 (24 pages).
Vougioukas et al., "A System for Basic-Level Network Fault Management Based on the GSM Short Message Service (SMS)," In: Proceedings of EUROCON'2001 International Conference on Trends in Communications, vol. 1, pp. 218-222 (5 pages).
United States Patent and Trademark Office, "Non-Final Office Action," issued in connection with U.S. Appl. No. 12/243,633, mailed Dec. 6, 2011, 12 pages.
State Intellectual Property Office, P.R. China, "First Office Action," with English translation, issued in connection with Chinese application serial No. 201010206959, issued Dec. 16, 2011, 11 pages.
United States Patent and Trademark Office, "Notice of Allowance," issued in connection with U.S. Appl. No. 12/243,633, mailed May 29, 2012, 19 pages.

United States Patent and Trademark Office, "Restriction Requirement," issued in connection with U.S. Appl. No. 12/243,699, mailed Jun. 21, 2012, 5 pages.

United States Patent and Trademark Office, "Non-Final Office Action," issued in connection with U.S. Appl. No. 12/911,044, mailed Aug. 17, 2012, 25 pages.

United States Patent and Trademark Office, "Non-Final Office Action," issued in connection with U.S. Appl. No. 12/243,699, mailed Nov. 23, 2012, 59 pages.

* cited by examiner

METHODS AND APPARATUS TO IDENTIFY WIRELESS SUBSCRIBER ACTIVITY STATUS

FIELD OF THE DISCLOSURE

This disclosure relates generally to wireless market research and, more particularly, to methods and apparatus to identify wireless subscriber activity status.

BACKGROUND

Wireless telephone services may be provided to consumers through contractual agreements in which a subscriber is obligated to pay a set amount of money per month for a predetermined number of months or years, and receives a predetermined set of wireless features. Wireless features may include a predetermined number of minutes per time period (e.g., a number of talk-time minutes per month), a predetermined number of text messages (e.g., short-message-service (SMS) text messages) per time period, and/or a predetermined amount of data usage per time period (e.g., a number of megabytes (MB) of data for wireless electronic mail, Internet access, etc.). Some consumers prefer to avoid contractual agreements when obtaining one or more wireless services and/or features. Such consumers may, instead, obtain wireless services by way of subscribing to prepaid wireless plans that do not require credit checks, social security numbers, and/or extended contractual terms that may be associated with contract termination fees.

Prepaid wireless subscribers typically own and/or purchase a wireless telephone and separately purchase a quantity of minutes to be used with the wireless telephone. If a purchased quantity of minutes (and/or any other wireless service-type such as text messaging, data services, etc.) is fully used or expires from lack of use, the subscriber may purchase additional wireless services from a kiosk and/or retailer (e.g., a convenience store). When a contractual wireless subscriber does not use their phone for a period of time during the contract, such subscribers continue to pay an agreed contract price for each delineated time period (e.g., a flat fee per month during the contract duration). On the other hand, when a prepaid wireless subscriber does not use their phone for a period of time (e.g., 60 days, 90 days, etc.), the purchased quantity of minutes may expire from lack of use, but the subscriber's authorization to use the wireless telephone number associated with the wireless telephone remains available when additional minutes are purchased. In some instances, one or more other time periods of inactivity with a prepaid wireless phone may result in relinquishment of the subscriber's wireless telephone number.

While a wireless network may include subscribers associated with both long-term contractual wireless consumers and prepaid wireless consumers, calculating and or measuring an active subscriber base may include contractual wireless consumers, prepaid wireless consumers having active credit (e.g., active minutes that have not expired due to lack of use), and prepaid wireless consumers having expired credit.

DETAILED DESCRIPTION

Example methods and apparatus to identify wireless subscriber activity status are disclosed. A disclosed example method includes identifying a market of interest associated with wireless services, and creating a list of telephone numbers (TNs) from the identified market of interest. The example method also includes initializing each TN in the list of TNs as dormant, monitoring each TN in the list of TNs during a monitoring duration for an indication of activity, and when the indication of activity is received, associating one of the TNs in the list of TNs with an active status.

A disclosed example apparatus includes a market identification manager to identify a market of interest associated with wireless services and to create a list of TNs from the identified market of interest, a short message service (SMS) manager to send an SMS message to a wireless network, the SMS message associated with at least one TN in the list of TNs, and a host register interface to receive an indication of activity during a monitoring duration in response the SMS message.

Wireless subscribers that utilize their wireless telephone, and thereby consume a quantity of wireless services, are referred- to as active subscribers. The methods and apparatus described herein also apply to prepaid wireless subscribers. Prepaid wireless services may include, but are not limited to, a quantity of minutes of talk-time with the wireless telephone, a quantity of text messages capable of being sent and/or received, and/or a quantity of data capable of being sent and/or received (e.g., electronic mail services, wireless Internet access services, picture messaging, etc.). Active subscribers have an active line, which is a wireless telephone number associated with a wireless telephone for which the prepaid wireless services are purchased and used within a predetermined period of time prior to expiration. However, in the event that a prepaid wireless subscriber does not use purchased prepaid wireless services with the predetermined period of time prior to their expiration, the prepaid subscriber is categorized as dormant.

Dormant prepaid wireless subscribers have full rights to use their wireless telephone (and associated wireless telephone number) on a carrier network when additional wireless services are purchased (e.g., via a subscriber identity module (SIM) card purchased from a kiosk, a convenience store, etc.). In some circumstances, prepaid wireless telephones with expired minutes are still authorized to make emergency calls. Regardless of whether a subscriber has active prepaid services available (e.g., the subscriber has unused purchased minutes and has not exceeded the expiration time threshold for those minutes), the subscriber will be identified as active if the wireless telephone is powered-on, consuming airtime, and/or any other activity that may invoke a registration event, such as a location update, a wireless device leaving a network geography, and/or when a wireless device enters a network geography. Generally speaking, a wireless telephone attempts to locate one or more carriers and/or networks upon power-up (and/or any other registration event), which effectively registers the wireless telephone on the available network (e.g., a network available by way of a wireless cell tower and its associated radius). However, for those subscribers that leave their wireless telephone in a powered-off state, one or more networks are not capable of identifying the status of the wireless telephone, thus, such powered-off telephones and/or telephones that do not exhibit any registration event activity are identified as dormant if they do not register with the network and/or if they do not register with the network after a period of inactivity.

Market researchers, which may include, but are not limited to analysts, wireless service providers, and/or ratings organizations (e.g., J.D. Power and Associates, Jupiter Research, etc.) may collect wireless subscriber activity data to measure carrier market share. Typically, a subscriber is considered to be associated with a carrier when that subscriber is using one or more wireless services provided by the carrier, such as voice, text and/or data services. Additionally, because a dormant subscriber has authorization to use one or more resources and/or services provided by the carrier, the dormant subscriber is also considered in one or more calculations to determine the market share of the carrier. However, dormant subscribers may tend to skew one or more calculations related to market share of the carrier because such dormant subscribers do not reflect current revenue activity for the carrier, unlike the active subscribers that are currently paying for services and/or have paid for wireless services in a relatively recent time frame. As a result, in the event that dormant subscribers are included in one or more calculations related to market share, corresponding results may incorrectly and/or artificially inflate revenue generating activity of the carrier.

The methods and apparatus described herein seek to, in part, separate dormant wireless telephone numbers from active wireless telephone numbers. As a result, one or more calculations related to carrier market share reflect revenue generation in a more accurate manner when only the active subscribers are considered.

Figure 1:
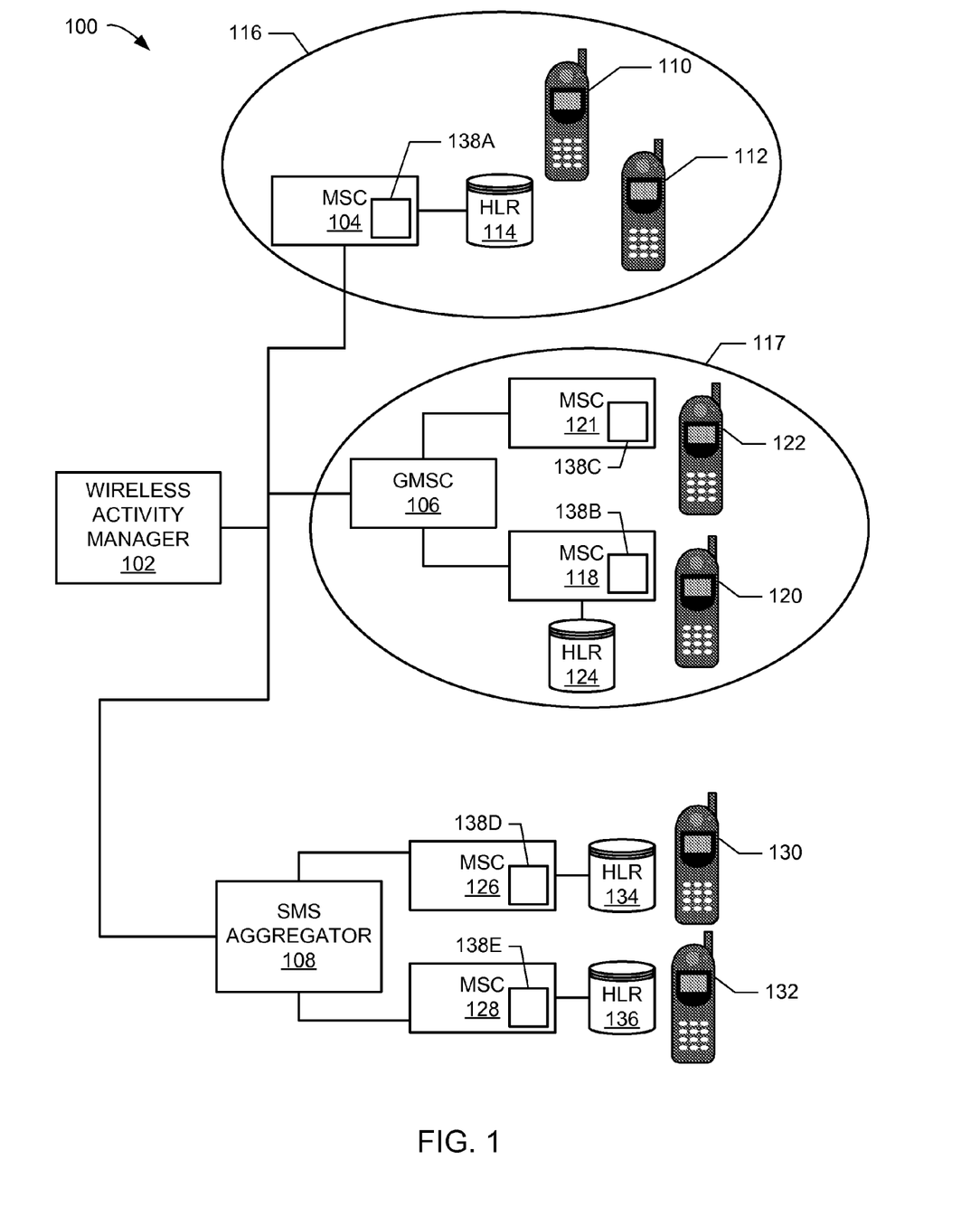
FIG. 1 is a block diagram of an example system to identify wireless subscriber activity status.

FIG. 1 is an illustration of an example system 100 to identify wireless subscriber activity status. In the illustrated example of FIG. 1, the system 100 includes a wireless activity manager 102 communicatively connected to a first mobile switching center (MSC) 104, a gateway MSC (GMSC) 106, and a short message service (SMS) aggregator 108. The example first MSC 104 operates as a delivery node to manage voice calls, SMS calls/messages and/or other services provided by the carrier. Generally speaking, the first MSC 104 sets up and releases end-to-end connections between a first wireless telephone 110 and/or a second wireless telephone 112, handles hand-over requirements (e.g., wireless subscribers traveling from one tower to another tower) and/or account monitoring. The example first MSC 104 is communicatively connected to an example home location register (HLR) 114, which contains details of each wireless telephone subscriber that is authorized to use a carrier network 116. For example, the example HLR 114 may store details of every subscriber identity module (SIM) card issued by the carrier and/or one or more mobile virtual network operators (MVNOs), which lease space on traditional carrier networks instead of owning and/or managing their own infrastructure to provide prepaid wireless services. Each SIM card includes an international mobile subscriber identity (IMSI), which is a unique identifier referenced in the HLR. SIM cards are typically authenticated and associated with a wireless telephone number associated with the subscriber's wireless device (e.g., wireless telephone).

Communication between the example wireless activity manager 102 and one or more wireless telephones may also occur via the example GMSC 106, which determines a proper MSC to which a call originates or should be routed. In the illustrated example of FIG. 1, the GMSC 106 is located in a second carrier network 117 and may route communications to a second MSC 118, which services a third wireless telephone 120, or a third MSC 121, which services a fourth wireless telephone 122. As described above, each MSC is communicatively connected to an HLR, such as an example HLR 124 that is communicatively connected to the second MSC 118.

In some circumstances, an SMS aggregator 108 operates to manage SMS messages for the example carrier. SMS aggregators provide a gateway function for one or more carriers and handle a relatively large amount of SMS traffic. Additionally, carriers do not typically process SMS message delivery status information, such as whether the SMS message was successfully delivered based on, for example, a power status of the receiving wireless telephone. SMS aggregators also handle bulk SMS message delivery and receipt. In the illustrated example of FIG. 1, the SMS aggregator 108 is communicatively connected to a fourth MSC 126 and a fifth MSC 128, which serve as delivery nodes for a fifth wireless telephone 130 and a sixth wireless telephone 132, respectively. The example fourth MSC 126 is communicatively connected to an HLR 134 and the example fifth MSC 128 is communicatively connected to an HLR 136. While each of the wireless telephones 110, 112, 120, 122, 130 and 132 is shown as a single wireless telephone, any number of wireless telephones and/or wireless devices may be serviced by each of the respective MSCs (104, 106, 126, 128).

In operation, the example wireless activity manager 102 initiates/sends SMS messages for a panel of wireless telephone numbers (TNs) of interest, such as wireless TNs associated with a particular carrier and/or a particular geographic location (e.g., a region, a state, a county, a city, etc.). SMS messages sent by the wireless activity manager 102 may query each HLR to identify a status of an associated TN as active or dormant. In another example, the wireless activity manager 102 may generate a call to one or more TNs of interest from the panel to determine whether each TN is active or dormant based on whether or not the called party answers the telephone. Without limitation, the methods and apparatus described herein may also collect subscriber data via one or more network database techniques and/or one or more signaling techniques as described in co-pending application Ser. No. 11/445,069 filed on May 31, 2006, which is hereby incorporated by reference herein in its entirety. Additionally, the SMS messages sent by the example wireless activity manager 102 may include a TN watch list that is sent to a remote register manager (RRM) in each MSC. In the illustrated example of FIG. 1, the first MSC 104 includes a first RRM 138A, the second MSC 118 includes a second RRM 138B, the third MSC 121 includes a third RRM 138C, the fourth MSC includes a fourth RRM 138D and the fifth MSC 136 includes a fifth RRM 138E. Each of the example RRMs 138A-E receives and stores the TN watch list generated from the panel of TNs of interest and monitors each TN for an event message, which occurs in response to wireless device registration event(s), such as a subscriber turning-on and/or using a wireless telephone. Wireless device registration events may also include circumstances in which a location update occurs with the wireless device, a wireless devices leaves a network geography, a wireless device enters a network geography, and/or one or more coverage breaks in a wireless network area. The event message may include, but is not limited to, an Alert Service Center (ASC) message, a global system for mobile (GSM) communications message, a code division multiple access (CDMA) message (e.g., an SMSNotification message, an SMS Request, etc.), a time division multiple access (TDMA) message, and/or a frequency division multiple access (FDMA) message. To the extent that event messages in the form of one or more ASC messages are described herein, such event messages are used for example purposes and not limited only to ASC messages. While each example RRM 138A-E is shown as a component of a corresponding MSC, the example RRMs 138A-E may, instead, be implemented as a stand-alone element communicatively connected to each MSC (104, 118, 121, 126, 128).

In the event that a TN was previously identified as dormant, receipt of an ASC message at the wireless activity manager 102 causes the system 100 to identify the corresponding TN as active rather than dormant. The watch list is monitored for a period of time, after which the TNs that have not received a corresponding ASC message are considered dormant and, accordingly, separated from one or more calculations related to market share. As a result, the one or more calculations related to market share may occur without data (i.e., TNs) associated with subscribers that are not currently spending money for one or more wireless services.

Figure 2:
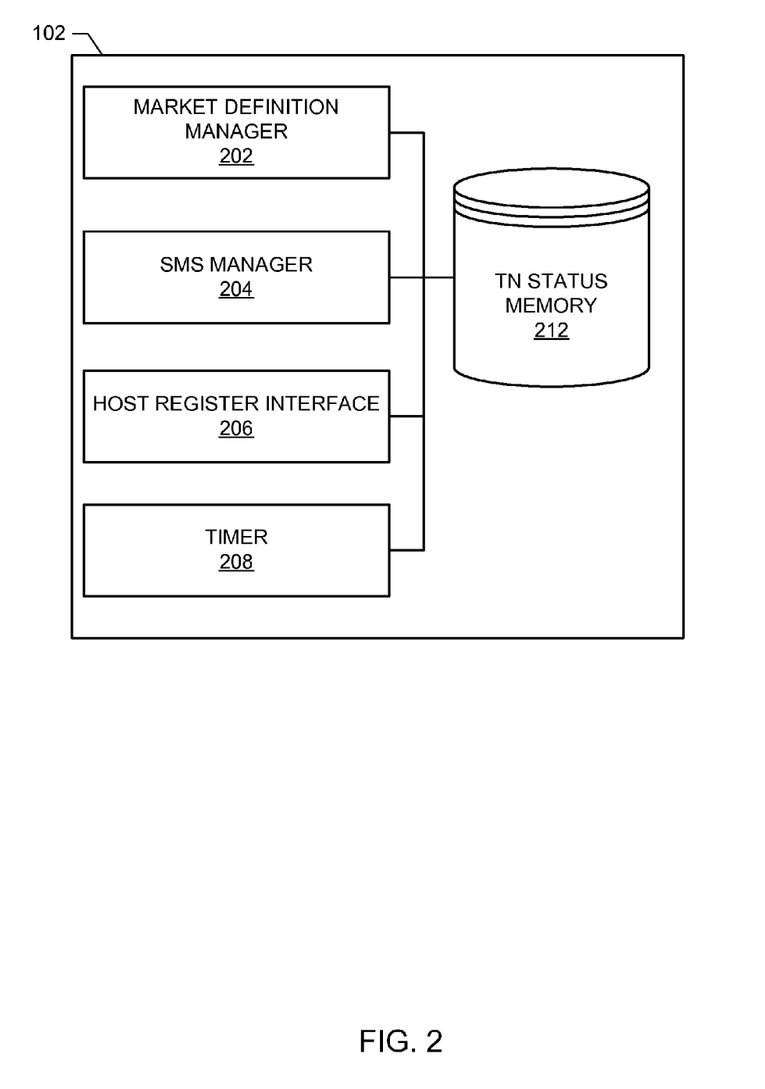
FIG. 2 is a block diagram of an example wireless activity manager as shown in FIG. 1.

FIG. 2 is a detailed schematic illustration of the example wireless activity manager 102 shown in FIG. 1. The example wireless activity manager 102 includes a market definition manager 202, an SMS manager 204, a host register interface 206, a timer 208, and a TN status memory 212. In operation, the example market definition manager 202 identifies TNs from a market of interest and/or a geography of interest for a carrier of interest. Without limitation, the example market definition manager 202 may select the one or more TNs of interest having more than one associated carrier. The market of interest may be defined in any number of ways including, but not limited to TNs associated with prepaid subscribers and/or TNs allocated for prepaid accounts. In some examples, one or more routing databases may be queried to obtain TNs of interest, such as from the Local Exchange Routing Guide (LERG) database provided and managed by Telecordia, which provides carrier information for properly routing calls to blocks of numbers within the North American Country Code 1 calling area. LERG provides, in part, information related to the serving carrier(s) for a given subscriber and, in some instances, information related to the type of service provided. Without limitation, other databases specific to any other third party and/or international numbering system may be used to define one or more markets of interest, and/or carriers may provide one or more TN watch lists in an effort to better understand their market share after removing dormant TNs that may be skewing (e.g., overestimating) market share results.

For each of the TNs identified in the market of interest, also referred to herein as a watch list, the example SMS manager 204 initiates an outgoing SMS message to determine a current status of the TN. The SMS message generated by the example SMS manager 204 may include, but is not limited to a mobile application part (MAP) message sent to the HLR (e.g., HLRs 114, 124, 134, 136) to request routing information to route calls to a mobile subscriber. MAP messages may employ one or more interfaces, such as a send routing information (SRI) for short message (SM) interface that, after received by the HLR, returns an MSC number if the TN has a corresponding wireless telephone that is powered on, or returns an "Absent Subscriber" message if there is no corresponding wireless device associated with the TN of interest. All TNs in the watch list may be identified as provisionally dormant until an indication of power-on and/or use is received by the example wireless activity manager 102. Status information indicators of dormant or active may be stored in the example TN status memory 212.

In the illustrated example of FIG. 2, the host register interface 206 uploads the watch list to each RRM 138A-E. Additionally, the example wireless activity manager 102 initiates the timer 208 that is set with a predetermined threshold amount of time to monitor the TNs in the watch list. As described in further detail below, each RRM 138A-E receives and/or generates ASC messages when a wireless device registers on the network. Upon receipt of a registration action and/or an indication of registration and/or power-on activity associated with a TN, the example RRM 138A-E determines if the registered TN is in the watch list and, if so, identifies the corresponding TN as active rather than dormant. Such TN status changes are saved to the example TN status memory 212.

Figure 3:
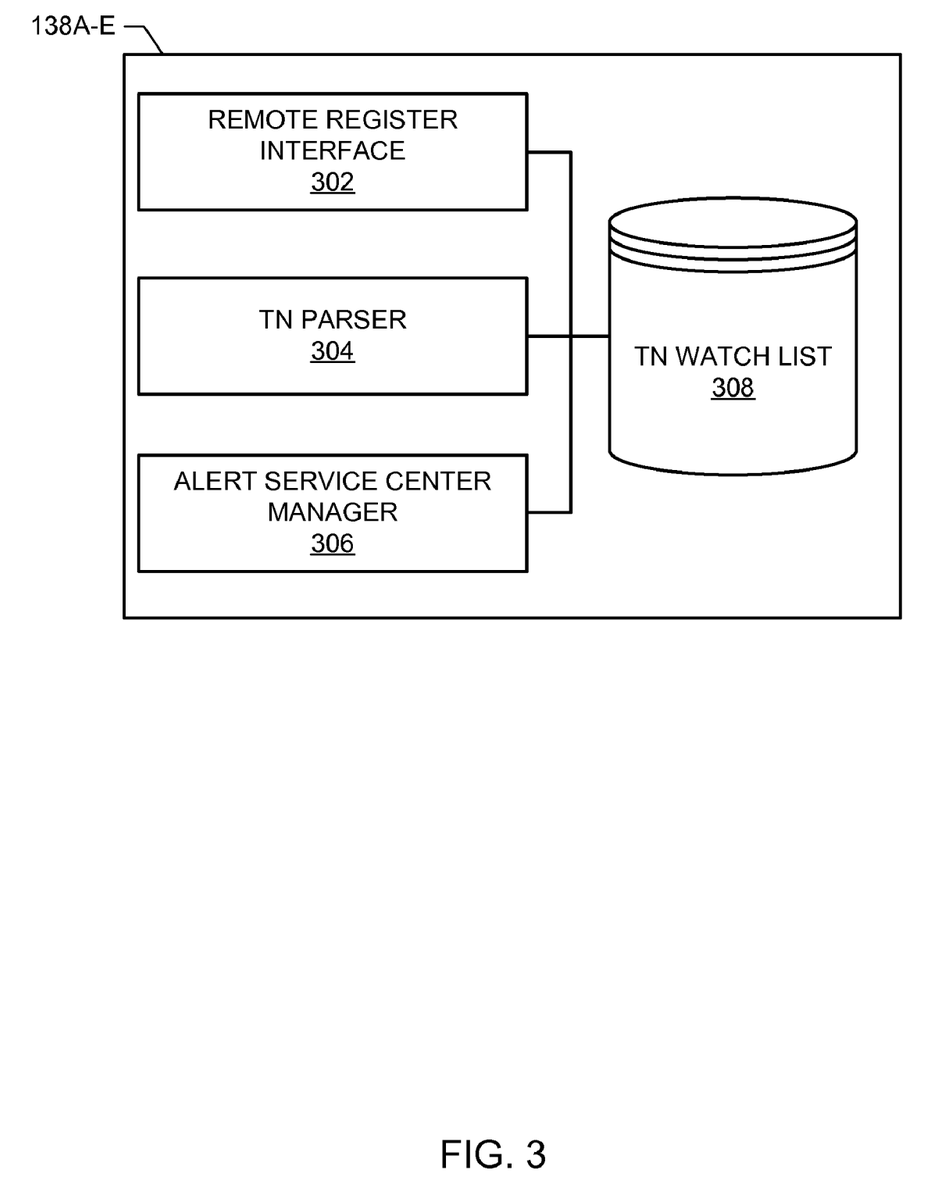
FIG. 3 is a block diagram of an example remote register manager as shown in FIG. 1.

FIG. 3 is a detailed schematic illustration of the example RRMs 138A-E shown in FIG. 1. Each of the example RRMs 138A-E includes a remote register interface 302, a TN parser 304, an Alert Service Center manager 306, and a TN watch list memory 308. In operation, the example remote register interface 302 receives a request from the host register interface 206 of the example wireless activity manager 102 to monitor one or more TNs for an ASC message and/or an indication of power-on of a wireless device associated with the TNs. In particular, the remote register interface 302 receives the watch list from the host register interface 206 and stores the list in the example TN watch list memory 308. Upon receipt of an ASC message (e.g., from one or more carrier network elements, such as an HLR) and/or upon receipt of an indication of wireless device registration and/or power-up, which is processed by the ASC manager 306 to extract an associated TN, the example TN parser 304 compares the received TN in the received ASC message with the TNs saved in the TN watch list memory 308 to identify a match. If no match occurs, then the ASC message is associated with a wireless device unassociated with the market of interest. However, if the received TN (as determined by the received ASC message) includes a match in the TN watch list memory 308, then the TN and associated wireless device are identified as active.

While an example system 100 to identify wireless subscriber activity status has been illustrated in FIGS. 1-3, one or more of the interfaces, data structures, elements, processes and/or devices illustrated in FIGS. 1-3 may be combined, divided, re-arranged, omitted, eliminated and/or implemented in any other way. Further, the example wireless activity manager 102, the example remote register managers 138A-E, the example market definition manager 202, the example SMS manager 204, the example host register interface 206, the example timer 208, the example TN status memory 212, the example remote register interface 302, the example TN parser 304, the example ASC manager 306 and/or the example TN watch list memory 308 of FIGS. 1-3 may be implemented by hardware, software, and/or firmware. Thus, for example, any of the example wireless activity manager 102, the example remote register managers 138A-E, the example market definition manager 202, the example SMS manager 204, the example host register interface 206, the example timer 208, the example TN status memory 212, the example remote register interface 302, the example TN parser 304, the example ASC manager 306 and/or the example TN watch list memory 308 may be implemented by one or more circuit(s) (ASIC(s)), programmable logic device(s) (PLD(s)), and/or field programmable logic device(s) (FPLD(s)), etc. When any of the appended claims are read to cover a purely software and/or firmware implementation, at least one of the example wireless activity manager 102, the example remote register managers 138A-E, the example market definition manager 202, the example SMS manager 204, the example host register interface 206, the example timer 208, the example TN status memory 212, the example remote register interface 302, the example TN parser 304, the example ASC manager 306 and/or the example TN watch list memory 308 are hereby expressly defined to include a tangible medium, such as a memory, a digital versatile disc (DVD), a compact disc (CD), etc. storing the firmware and/or software. Further still, a communication system may include interfaces, data structures, elements, processes, and/or devices instead of, or in addition to, those illustrated in FIGS. 1-3 and/or may include more than one of any or all of the illustrated interfaces, data structures, elements, processes and/or devices.

FIGS. 4A, 4B, 5 and 6 illustrate example processes that may be performed to implement the example wireless activity manager 102 and the example remote register managers 138A-E of FIGS. 1-3. The example processes of FIGS. 4A, 4B, 5 and 6 may be carried out by a processor, a controller, and/or any other suitable processing device. For instance, the example processes of FIGS. 4A, 4B, 5 and 6 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 7). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 4A, 4B, 5 and 6 may be implemented using any combination(s) of ASIC(s), PLD(s), FPLD(s), discrete logic, hardware, firmware, etc. Also, one or more operations of the example processes of FIGS. 4A, 4B, 5 and 6 may instead be implemented manually or as any combination of any of the foregoing techniques, for example, any combination of firmware, software, discrete logic, and/or hardware. Further, many other methods of implementing the example operations of FIGS. 4A, 4B, 5 and 6 may be employed. For example, the order of execution of the blocks may be changed, and/or one or more of the blocks described may be changed, eliminated, sub-divided, or combined. Additionally, any or all of the example processes of FIGS. 4A, 4B, 5 and 6 may be carried out sequentially and/or carried out in parallel by, for example, separate processing threads, processors, devices, discrete logic, circuits, etc.

Figure 4A:
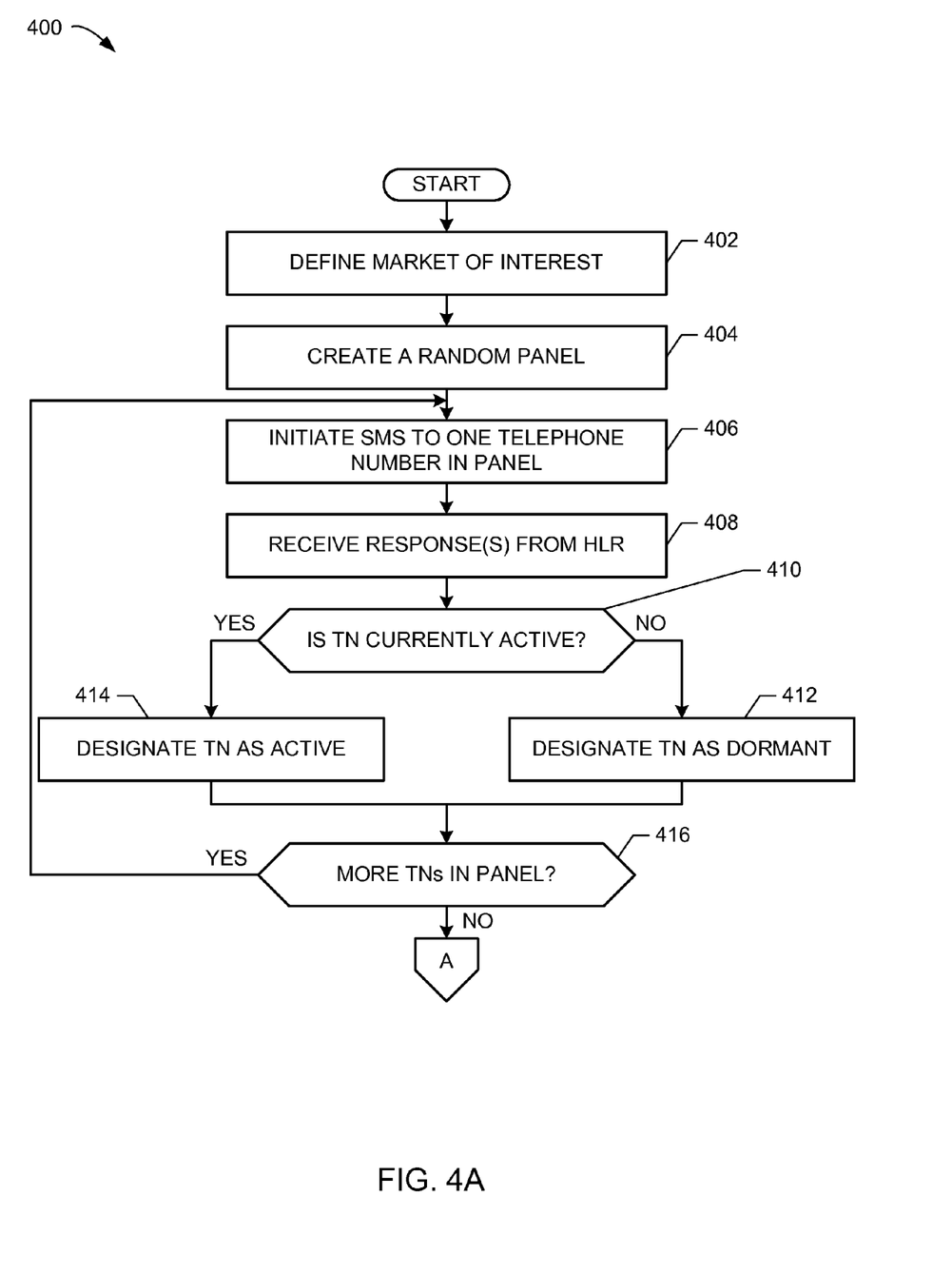
FIGS. 4A, 4B, 5 and 6 are flowcharts representative of example processes that may be performed to implement one or more entities of the example systems and apparatus of FIGS. 1-3.

An example process 400 of FIG. 4A begins with the example market definition manager 202 defining a market of interest (block 402). As described above, the market definition manager 202 may identify a geographic region of interest, a carrier of interest and/or any combination thereof and generate, from an available pool of TNs in the defined market of interest, a random panel of TNs (block 404). A TN from the random panel is selected by the example SMS manager 204 to initiate an SMS message (block 406), such as an SRI-SM message. The SMS message causes a target HLR to query its memory for the selected TN, and the example host register interface 206 receives a response from the target HLR (block 408).

Responses from the target HLR are interpreted by the example host register interface 206 (block 410) to determine if the TN is active. In some instances, the target HLR responds to the SRI-SM message with an "Absent Subscriber" message, in which case the selected TN is identified as dormant (block 412). On the other hand, if the example host register interface 206 receives an MSC number, then the selected TN is identified as active (block 414). As described above, return of an MSC number by the example HLRs 114, 124, 134, 136 occurs in circumstances when a wireless device is powered-on and/or attempting to register on a network. In the event that there are additional TNs from the random panel of TNs that have not been tested for activity (block 416), control returns to block 406 to initiate another SMS message associated with a different TN.

Although some of the TNs in the random panel of TNs generated by the market definition manager 202 may initially indicate a state of active, some of the other TNs in the random panel of TNs may be identified as dormant only because one or more of the associated wireless telephones are switched off. Generally speaking, some subscribers may keep their wireless telephones in a powered off state on a periodic basis (e.g., powered off at night, powered on during the day), some subscribers may turn on their wireless telephones only when needed (e.g., on a weekly basis), and/or some subscribers may exhibit intermittent behavior and only turn on their wireless telephones at random times. As shown in the illustrated example process 400 of FIG. 4B, to account for one or more circumstances in which a prepaid wireless subscriber does not currently have their wireless telephone powered on, TNs having an initial status of active are removed from the watch list (block 417) and the example timer 208 is set to a value and initiated to count up or count down (block 418) (e.g., a count-down timer, a count-up timer). For example, if the timer 208 is set for a period of three weeks, then the example wireless activity manager 102 and/or the remote register managers 338A-E monitor for instances in which a subscriber, previously identified as dormant, turns on their wireless telephone. Longer periods of time in which the example timer 208 is set will afford greater opportunities to capture subscriber behavior of wireless telephone use, such as those subscribers that only use their wireless telephone on a rare and/or intermittent basis.

Figure 4B:
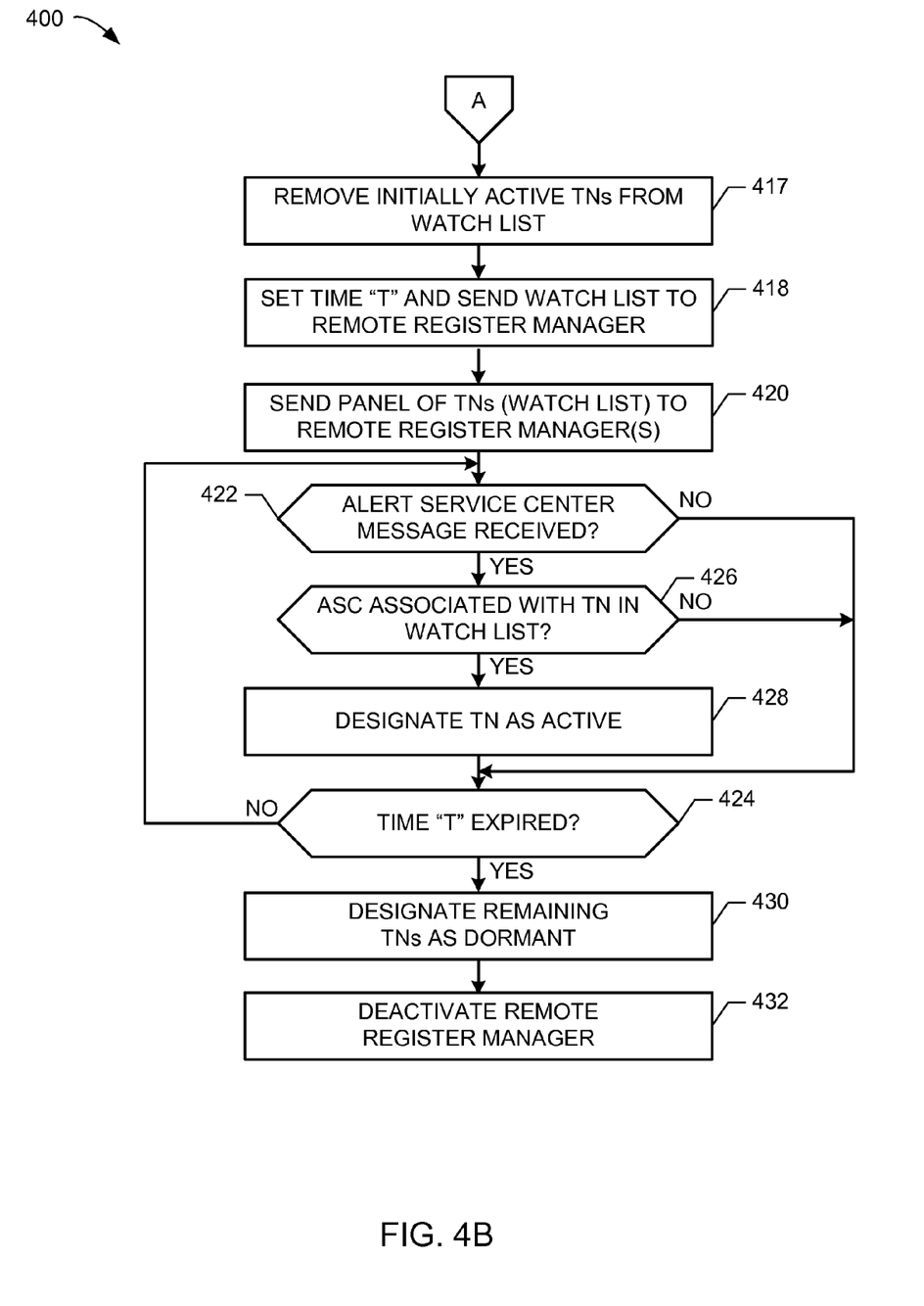

The random panel of remaining TNs (watch list) created by the example market definition manager 202 is sent to the remote register manager 338A-E (block 420), and the RRM 338A-E monitors for ASC messages associated with the TNs in the watch list (block 422). If no ASC messages associated with the TNs in the watch list are detected by the RRM 338A-E, the example process 400 advances to block 424 to determine if the example timer 208 has expired. When an ASC message is received (block 422), but it is not associated with a TN in the watch list (block 426), then the TN is ignored due to its absence from the watch list and control advances to block 424 to determine if the example timer 208 has expired. On the other hand, when the ASC message is associated with a TN in the watch list (block 426), then that TN is identified as active (block 428). If the example timer 208 has not expired (block 424), control returns to block 422 to continue to monitor for ASC messages sent by the example HLRs 114, 124, 134, 136 and/or sent by other network elements. When the example timer 208 expires (block 424), all TNs that have not previously been identified as active are identified and/or otherwise confirmed as having dormant state (block 430), and the example RRMs 338A-E are deactivated (block 432).

Figure 5:
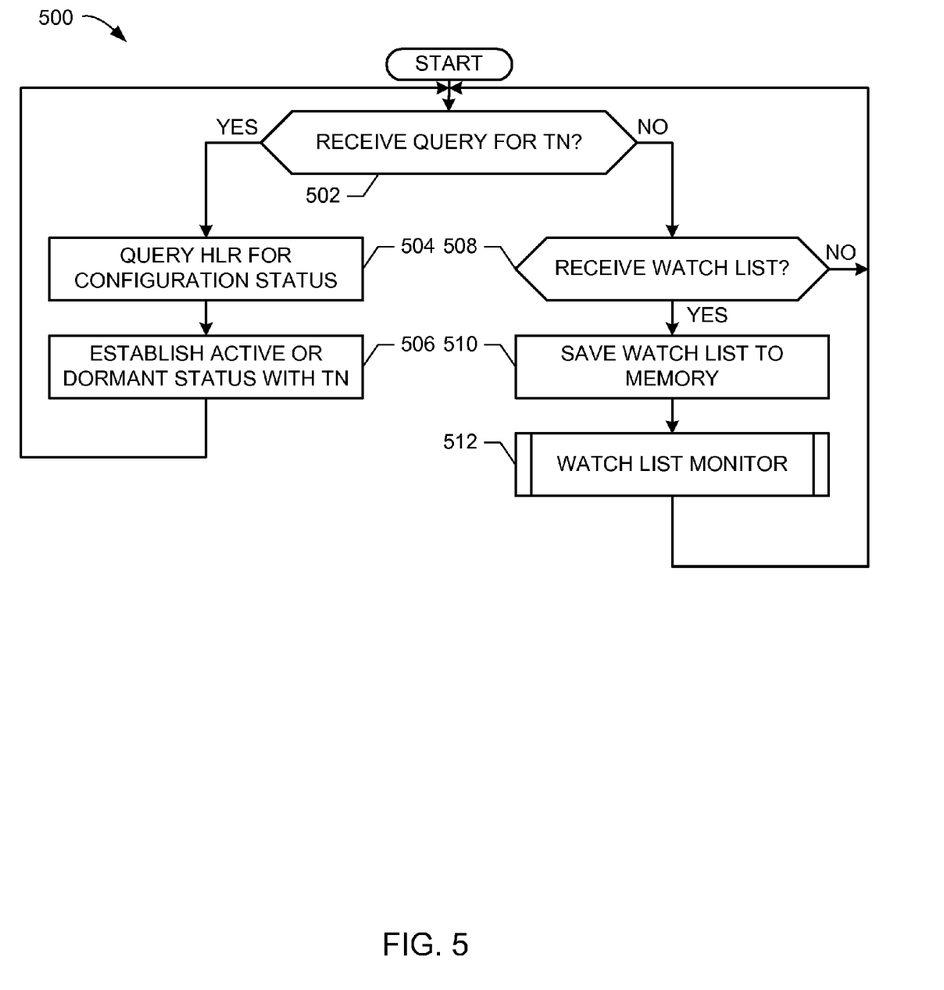

FIG. 5 illustrates an example process 500 that may be performed to implement the example RRMs 138A-E of FIGS. 1 and 3. The example process 500 of FIG. 5 begins with the example remote register interface 302 monitoring for TN queries (block 502). If a TN query is received by the example remote register interface 302 (block 502), then the remote register interface 302 queries an HLR 114, 124, 134, 136 for currently known status information (block 504). For example, the example HLR 114, 124, 134, 136 may identify an active status or a dormant status (block 506), which is returned to the requester (e.g., the wireless activity manager 102). Control returns to block 502 to monitor for additional queries specific to a TN. However, if no query is received for a specific TN (block 502), the example remote register interface 302 determines whether a TN watch list is received (block 508), such as a list of TNs generated as a random panel by the example market definition manager 202. In the event that a watch list is received (block 508), the received watch list is saved to the example TN watch list memory 308 (block 510).

Figure 6:
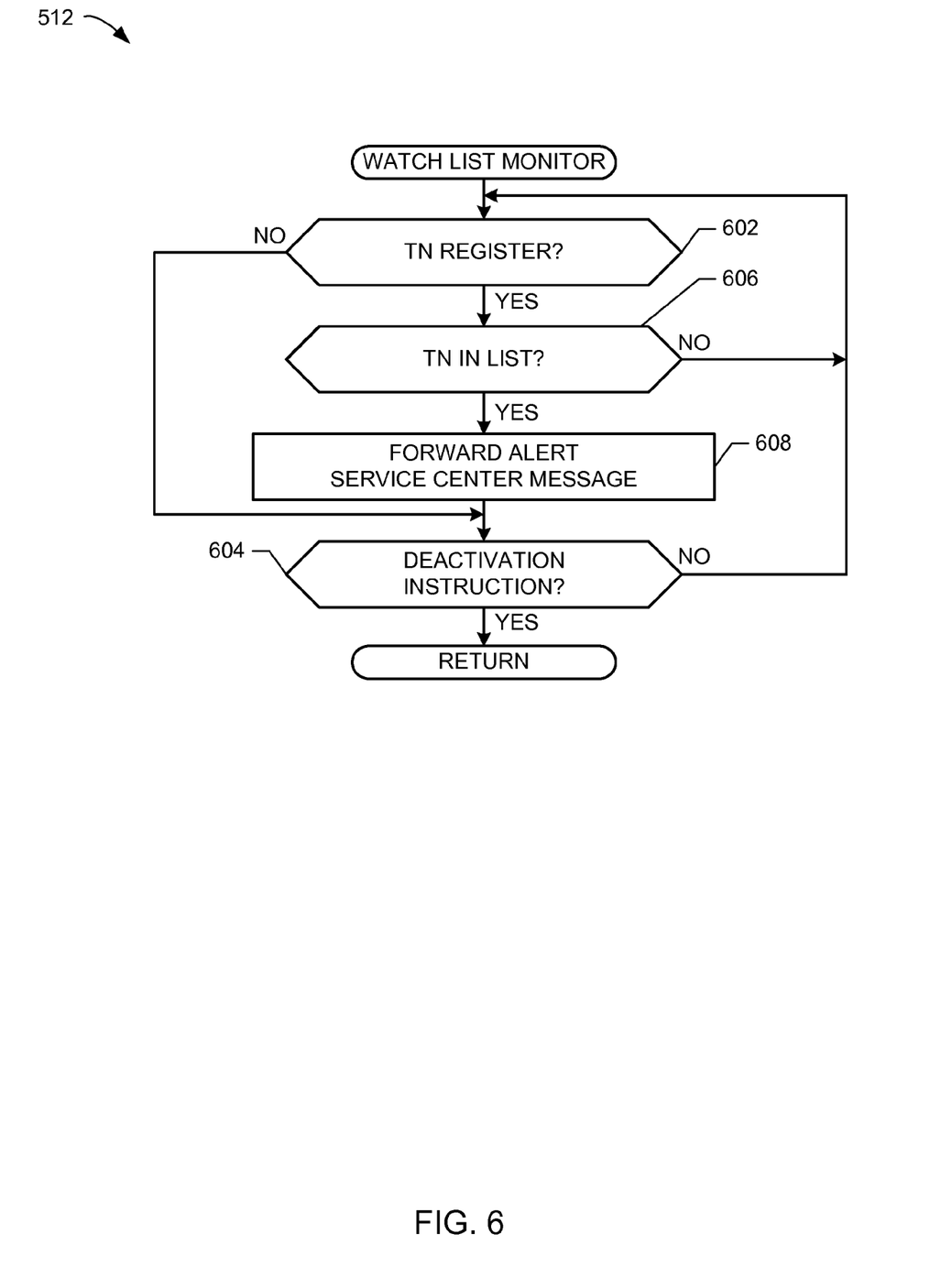

Upon receipt of the example watch list, the example alert service center manager 306 of the RRM 338A-E initiates a watch list monitor process (block 512) to monitor for one or more occurrences of a registration attempt within the wireless network, as shown in FIG. 6. In particular, the example alert service center manager 306 monitors for the occurrence of a wireless telephone registering on the network (block 602). If no registration attempt is detected (block 602), the alert service center manager 306 identifies whether a deactivation instruction has been received (block 604). The example deactivation instruction may be invoked by the wireless activity manager 102 when the example timer 208 expires (e.g., after 3-weeks of monitoring time). As such, the example RRMs 338A-E will not continue to monitor in an endless loop. When the alert service center manager 306 detects that a wireless telephone registers on the network (block 602), such as upon receipt of an ASC message from the network, the example TN parser 304 extracts a TN from the received registration communication associated with the registration attempt (e.g., an ASC message) and compares it to the watch list (block 606). If the received TN is not in the watch list (block 606), then it is ignored for its absence from the watch list and control returns to block 602 to continue to monitor for registration attempts.

On the other hand, when the example TN parser 306 identifies a match in the example TN watch list memory 308 (block 606), the example alert service center manager 306 forwards the received ASC message or any other network indication of wireless telephone registration and/or wireless telephone power-up to the example wireless activity manager 102 (block 608). Again, the example remote register interface 302 determines whether a deactivation instruction is received (block 604) to stop the example watch list monitor process 512.

Figure 7:
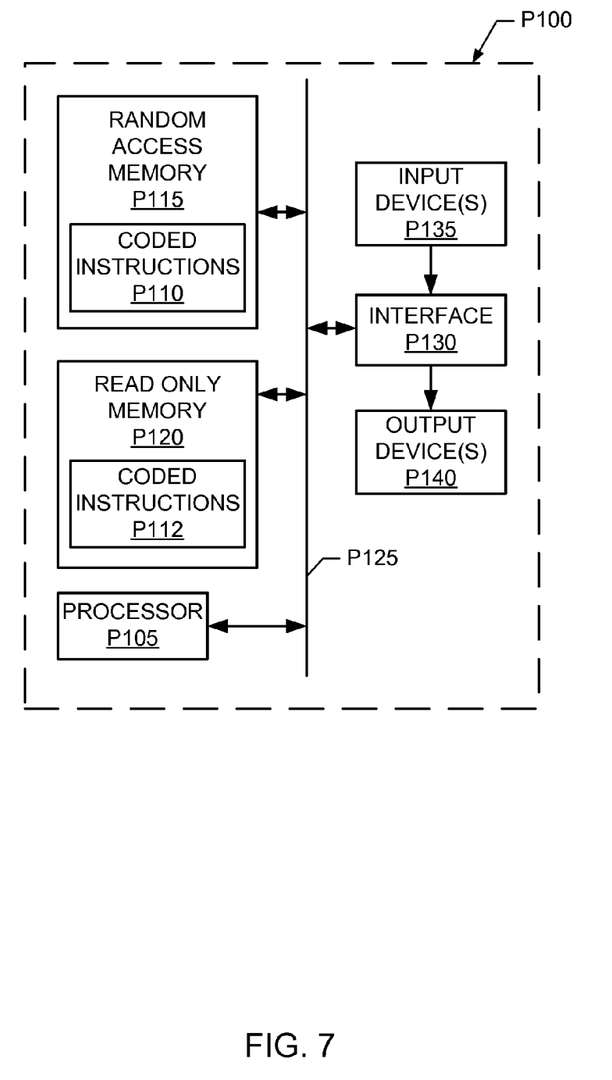
FIG. 7 is a block diagram of an example processor system that may be used to execute the example processes of FIGS. 4A, 4B, 5 and 6 to implement the example systems, apparatus, and/or methods described herein.

FIG. 7 is a schematic diagram of an example processor platform P100 that may be used and/or programmed to implement any or all of the example wireless activity manager 102, the example remote register managers 138A-E, the example market definition manager 202, the example SMS manager 204, the example host register interface 206, the example timer 208, the example TN status memory 212, the example remote register interface 302, the example TN parser 304, the example ASC manager 306 and/or the example TN watch list memory 308 of FIGS. 1-3. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4A, 4B, 5 and 6 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example TN status memory 212 and/or the example TN watch list of FIGS. 2 and 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to identify a status of a wireless telephone number, comprising:
   creating a list of telephone numbers (TNs) from an identified market of interest;
   distributing the list of TNs to a plurality of mobile switching centers (MSCs), each of the plurality of MSCs associated with a different carrier network;
   initializing each TN in the list of TNs as dormant;
   monitoring, with each MSC, each TN in the list of TNs during a monitoring duration for an MSC number in response to sending a short message service message to each of the TNs; and
   when the MSC number is received, associating one of the TNs in the list of TNs with an active status.

2. A method as defined in claim 1, further comprising generating a list of active TNs when the monitoring duration has ended.

3. A method as defined in claim 1, wherein creating the list of TNs further comprises creating a random panel of TNs.

4. A method as defined in claim 1, further comprising using a timer to establish the monitoring duration.

5. A method as defined in claim 1, wherein monitoring each TN in the list of TNs further comprises receiving an event message in response to a wireless device registration event.

6. A method as defined in claim 5, wherein the registration event comprises a wireless device power up.

7. A method as defined in claim 5, wherein the registration event comprises a location update.

8. A method as defined in claim 5, wherein the event message comprises an Alert Service Center message.

9. A method as defined in claim 5, wherein the event message is associated with at least one of a global system for mobile communications standard, a code division multiple access standard, a time division multiple access standard, or a frequency division multiple access standard.

10. A method as defined in claim 5, further comprising parsing the event message for a TN.

11. A method as defined in claim 10, further comprising ignoring the parsed TN when it is absent from the list of TNs.

12. A method as defined in claim 1, further comprising removing TNs from the list of TNs when an indication of active status is received in response to the SMS message.

13. A method as defined in claim 1, wherein the SMS message comprises a send routing information for short message interface.

14. A method as defined in claim 13, further comprising receiving a mobile switching center number when a wireless device associated with the TN registers with a wireless network.

15. A method as defined in claim 13, further comprising receiving an absent subscriber message when a wireless device associated with the TN is powered off.

16. An apparatus to identify a status of a wireless telephone number (TN), comprising:
- a market identification manager to identify a market of interest associated with wireless services and to create a list of TNs from the identified market of interest, and to distribute the list of TNs to a plurality of mobile switching centers (MSCs), each of the plurality of MSCs associated with a different carrier network;
- a short message service (SMS) manager to send an SMS message to a wireless network, the SMS message associated with at least one TN in the list of TNs; and
- a host register interface to receive an MSC number in response to the sent SMS message during a monitoring duration in response to the SMS message.

17. An apparatus as defined in claim 16, further comprising a TN status memory to store an activity status of each TN in the list of TNs.

18. An apparatus as defined in claim 16, further comprising a remote register manager (RRM) communicatively connected to each one of the plurality of MSCs to send and receive information from a carrier network.

19. An apparatus as defined in claim 18, wherein the RRM further comprises an alert service center manager to receive at least one indication of activity from at least one of the carrier network or a home location register.

20. A tangible machine readable storage medium excluding propagating signals comprising instructions that, when executed, cause a machine to, at least:
- create a list of telephone numbers (TNs) from an identified market of interest;
- distribute the list of TNs to a plurality of mobile switching centers (MSCs), each of the plurality of MSCs associated with a different carrier network;
- initialize each TN in the list of TNs as dormant;
- monitor each TN in the list of TNs during a monitoring duration for an MSC number in response to sending a short message service message to each of the TNs; and
- when the MSC number is received, associate one of the TNs in the list of TNs with an active status.

21. A machine-readable storage medium as defined in claim 20, wherein the machine readable instructions, when executed, cause the machine to receive an event message in response to a wireless device registration event.

* * * * *